Patented Oct. 6, 1953

2,654,678

UNITED STATES PATENT OFFICE 2,654,678

ANTISTATIC TREATMENT OF SHAPED ARTICLES COMPRISING A VINYL RESIN AND TREATED ARTICLES

Arthur Cresswell, Stamford, Conn., assignor to American Cyanamid Company, New York, N. Y., a corporation of Maine No Drawing. Application January 28, 1949, Serial No. 73,455

13 Claims. (Cl. 117—138.8)

This invention relates broadly to the treatment of shaped articles comprisng a thermoplastic vinyl resin with an anti-static agent and to the treated articles. The invention especially is concerned with a method of conditioning a shaped article (e. g., in the form of a fiber, film, etc.) comprising or composed of a thermoplastic vinyl resin to lessen its tendency to accumulate static charges of electricity thereon by contacting such an article with an anti-static agent comprising an N-(mono-aliphatic hydrocarbon) diguanidinium sulfosuccinamate, the aliphatic hydrocarbon grouping attached to the amide nitrogen atom containing from 12 to 18 carbon atoms, inclusive, as well as with the products resulting from this treatment. The treatment is effected by applying to the shaped article, which in a dry state normally has a tendency to accumulate static charges of electricity thereon, an N-monoalkyl or N-monoalkenyl diguanidinium sulfosuccinamate wherein the alkyl or alkenyl grouping attached to the amide nitrogen atom contains from 12 to 18 carbon atoms, inclusive, e. g., N-monododecyl, -dodecenyl, -tetradecyl, -tetradecenyl, -hexadecyl, -hexadecenyl, -octadecyl, -octadecenyl, etc., diguanidinium sulfosuccinamates. It is applicable to the treatment of filaments, fibers, yarns, films, woven, knitted and felted fabrics, and other articles made from or containing one or more thermoplastic vinyl resins for the purpose of eliminating substantially completely (in some cases) or materially lessening or retarding (in all other cases) the tendency of such articles to accumulate charges of static electricity thereon either during the production of the article, or in connection with subsequent finishing operations, or during the use of the article.

Vinyl resins constitute a class of materials which develop or tend to develop an electrostatic charge upon their surfaces when fibers or other articles made therefrom are subjected to friction during their production and during processing or fabrication of the fibers into fabrics or other articles, as well as during the use of the finished article. Various treatments have been tried or suggested in an effort to prevent or reduce the accumulation of an electrostatic charge on the surfaces of shaped articles made from vinyl resins, but to the best of my knowledge and belief none has been entirely satisfactory. For example, it was suggested prior to my invention that vinyl resins, more particularly those which contain a substantial percentage of vinyl halide combined in the molecules, be treated with a water-dispersible compound having a polyalkylene polyamine nucleus, which nucleus has an average molecular weight of at least 300, or with a water-dispersible polyethylene imine having an average molecular weight of at least 300, in order to prevent or retard the accumulation of charges of static electricity upon the surfaces of filaments, fibers, yarns and various fabrics and other articles made from or containing such resins. Such compounds are relatively expensive and do not completely meet the requirements of the trade.

The present invention is based on my discovery that diguanidinium salts of an N-(monoaliphatic hydrocarbon) sulfosuccinamic acid, wherein the aliphatic hydrocarbon grouping attached to the amide nitrogen atom contains from 12 to 18 carbon atoms, inclusive, have the particular and peculiar property of functioning as anti-static agents. (Such salts also may be named as given in the first paragraph of this specification.) The invention is based on my further discovery that filaments, fibers, yarns, films and other shaped articles composed of or containing a vinyl resin, more particularly a thermoplastic vinyl resin, e. g., polyacrylonitrile, copolymers of acrylonitrile and a different vinyl compound such, for instance, as vinyl chloride, copolymers of vinyl acetate and vinyl chloride, etc., can be conditioned so as to obviate or minimize their tendency to accumulate static charges of electricity thereon by treating them with one or more of the aforementioned salts, alone or in conjunction with a conventional textile lubricant, e. g., an alkyl ester of a long-chain fatty acid, a wetting and/or dispersing agent, a detergent, etc., as briefly described in the first paragraph of this specification and more fully hereafter. These results, for which I have no theoretical explanation and which were wholly unobvious and unpredictable, are obtained without detrimentally affecting the color, tensile strength, elasticity, flexibility, chemical resistance, bacterial and fungal resistance, and other valuable properties of the vinyl resin, or without rendering the vinyl resin article in any way unsuited for its intended purpose.

The diguanidinium salts which are used in carrying my invention into effect may be represented by the general formula I 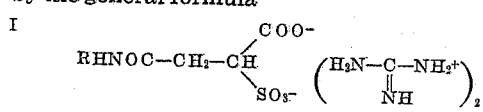

Alternatively, they may be represented by the general formula

II 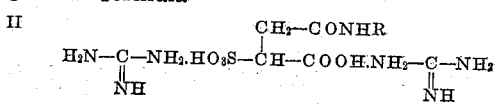

In each of the above formulas R represents an aliphatic hydrocarbon radical, more particularly such a radical which contains at least 12 carbon atoms and, advantageously, not more than 18 carbon atoms. Illustrative examples of radicals which R in the above formula may represent are dodecyl, tridecyl, tetradecyl, pentadecyl, hexadecyl (cetyl), heptadecyl, octadecyl, dodecenyl, tetradecenyl, hexadecenyl, octadecenyl (including oleyl), etc. These diguanidinium salts may be produced by any suitable method now known to those skilled in the art for the preparation of similar compounds.

A specific example of the preparation of a diguanidinium salt of the kind embraced by Formulas I and II, more particularly N-monoöctadecyl diguanidinium sulfosuccinamate, is as follows:

Three hundred and seventy-two grams (2.0 moles) of guanidine carbonate (98% pure) is dissolved in 2400 ml. of water in a suitable reaction vessel, e. g., a 5-liter flask. Sulfur dioxide is bubbled into this solution with stirring over a period of 3 hours. At this point, titration of a sample indicates that 2.92 moles of sulfur dioxide has been absorbed by the solution. The resulting solution of the guanidine derivative (probably a mixture of guanidine sulfite and guanidine bisulfite) is subsequently caused to react with N-octadecyl maleamic acid (N-monoöctadecyl maleamic acid), which may be prepared, for instance, as follows:

One hundred and ninety-eight grams (2.02 moles) of maleic anhydride is charged to a suitable reaction vessel, e. g., a 2-liter flask, and heated to 50°–55° C. until it is completely melted. To this is slowly added 580 grams of octadecyl (monoöctadecyl) amine in molten state over a period of 20 minutes. The temperature rises to about 120° C. during this addition. The product is N-monoöctadecyl maleamic acid.

The solution of the aforementioned guanidine derivative is diluted to 3500 ml. and heated on a steam bath. The N-monoöctadecyl maleamic acid, cooled to 85° C., is added to the hot, diluted solution of the guanidine derivative on the steam bath. The reaction mixture is stirred on the steam bath for 12 hours to assure complete reaction and optimum yield of N-monoöctadecyl diguanidinium sulfosuccinamate, which is isolated at the end of the reaction period from the slurry containing the same by any suitable means, e. g., by filtration.

Other sulfosuccinamates of the kind embraced by Formula I or mixtures comprising or composed of such sulfosuccinamates may be prepared in a similar manner by substituting for octadecyl amine an equivalent amount of any other mono-(aliphatic hydrocarbon) amine (or mixture of amines) corresponding to the aliphatic hydrocarbon grouping which it is desired to replace for a hydrogen atom attached to the amide nitrogen atom of the sulfosuccinamate. Thus, instead of using a single aliphatic hydrocarbon-substituted amine in the above preparation, I may use a mixture of such amines, for instance the product sold under the trade name of "Armeen TD" and which contains, by weight, about 30% of hexadecyl amine, about 25% of octadecyl amine and 45% of octadecenyl amine. The reaction product then comprises corresponding percentages of N-monohexadecyl, N-monoöctadecyl and N-monoöctadecenyl diguanidinium sulfosuccinamates.

Illustrative examples of vinyl resins to which the anti-static agents employed in practicing the present invention are applicable include vinyl resins produced by the conjoint polymerization of a vinyl halide, e. g., vinyl chloride, with a vinyl ester of an aliphatic acid, e. g., vinyl acetate. Such resins are more fully described in, for example, Rugeley et al. Patent No. 2,161,766, and generally contain about 50% to about 95% by weight of combined vinyl halide in the copolymer, the remainder being a vinyl ester of an aliphatic acid. Examples of other vinyl resins to which the present invention is applicable include those formed by the conjoint polymerization of a vinyl halide, e. g., vinyl chloride, with a nitrile of an unsaturated acid, e. g., acrylonitrile, methacrylonitrile, etc.; polyvinyl chloride and other polyvinyl halides, as well as resins produced by the halogenation (e. g., chlorination) of such polyvinyl compounds; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e. g., N-butyl maleimide; and resins produced by the conjoint polymerization of a vinyl halide, a vinyl ester of an aliphatic acid and maleic acid.

The preferred thermoplastic vinyl resins which are subjected to treatment in accordance with my invention are those in which the vinyl resin contains a substantial amount of acrylonitrile, more particularly polyacrylonitrile and thermoplastic copolymers of acrylonitrile such as those obtained by polymerizing a mixture of monomers comprising mainly, that is, a preponderant proportion by weight of acrylonitrile, and preferably those in which the acrylonitrile constitutes at least about 85% by weight of the mixture of monomers. From the foregoing it will be seen that in some cases the acrylonitrile may constitute, for example, from about 55% to about 99.5% by weight of the mixture of monomers.

Illustrative examples of monomers which may be copolymerized with acrylonitrile to yield a thermoplastic polymerization product (copolymer or interpolymer) which may be subjected to an anti-static treatment as herein described are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl, metallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which may be treated in accordance with the present invention, e. g., the dimethyl, -ethyl, -propyl, -butyl, etc., esters of maleic, fumaric, citraconic, etc., acids.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054. The polymeric and copolymeric acrylonitriles which are subjected to treatment may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements by the Staudinger equation (reference: U. S. Patent No. 2,404,713).

The diguanidinium salt may be applied to the thermoplastic vinyl resin by any suitable means, but preferably it is applied in the form of a liquid dispersion, more particularly an aqueous dispersion. This dispersion may contain any suitable amount of diguanidinium salt, but ordinarily the salt is present in the dispersion in an amount corresponding to from about 0.5% to about 5% by weight thereof. The dispersion may be applied, for example, by immersing the fiber or other shaped article formed of or containing the vinyl resin in the dispersion, or by spraying, padding, brushing or otherwise contacting the shaped article with the dispersion. In applying the dispersion, it is preferably heated to an elevated temperature, e. g., from about 45° or 50° C. to about 95° C., or in some cases even as high as 100° C. The dispersion may be applied at room temperature (20-30° C.) or at temperatures up to 45° C., but the lower temperatures are usually less desirable because of the somewhat greater difficulty in maintaining the diguanidinium salt homogeneously dispersed in water or other liquid dispersion medium at the lower temperatures. Upon drying the fiber or other shaped article at room temperature or at an elevated temperature, e. g., on heated drying rolls, the treated article has the aforementioned diguanidinium salt deposited at least on the outer surfaces thereof. The amount of diguanidinium salt which is present in or on the dried, treated article may vary considerably, but ordinarily it is present therein or thereon in an amount, by weight, corresponding to from about 0.2% to about 4% of the dried, untreated article.

It is not essential that the diguanidinium salt be used as the sole anti-static agent or effect agent which is present in the aqueous dispersion. In some cases, however, it is advantageous to use the diguanidinium salt alone, since, because of the long-chain aliphatic hydrocarbon grouping, specifically alkyl grouping, which is present therein, it is capable of functioning both as a lubricating agent and as an anti-static agent. In other cases it may be desirable to use the diguanidinium salt in conjunction with a conventional textile lubricant and/or other conditioning agent or agents which are commonly employed in finishing compositions used, for example, in treating thermoplastic vinyl resins in fiber, film or other form. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in combination with the diguanidinium salt are wetting and dispersing agents of various kinds, for example, N-octadecyl disodium sulfosuccinamate, dioctyl sodium sulfosuccinate, etc., lecithin, esters of long-chain fatty acids, advantageously esters of fatty acids which contain from 12 to 18 carbon atoms, inclusive, e. g., alkyl stearates, palmitates and oleates, more particularly the ethyl, propyl, butyl and amyl stearates, palmitates and oleates.

The finishing compositions containing an anti-static agent comprising a diguanidinium salt of the kind embraced by Formulas I and II may be applied to the shaped thermoplastic vinyl resin, for example yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the textile-treating agent containing the described anti-static agent may be applied both during the process of producing the yarns as well as later when these yarns are fabricated into textile fabrics.

The diguanidinium salt used in practicing my invention also may be applied to thermoplastic vinyl resins when the latter are in gelled form. For example, I may apply a liquid treating agent to a fiber in gel state, more particularly an aquagel state, and in which the solid phase comprises an acrylonitrile polymerization product, more particularly such a product which contains in the molecules thereof an average of at least about 85% by weight of combined acrylonitrile, which treating agent comprises an aqueous dispersion containing a diguanidinium salt of the kind embraced by Formulas I and II. Thereafter the thusly treated, gelled fiber is dried, for example by continuously passing the fiber over heated drying rolls as is described more fully in my copending application Serial No. 68,370 filed December 30, 1948, now abandoned. In this way the diguanidinium salt imparts anti-static characteristics to the fiber both during and after drying thereof.

The diguanidinium salts used in practicing the present invention are especially suitable for use in the treatment of water-swollen, oriented or unoriented fibers, films, etc., which have been produced as described, for example, in my copending application Serial No. 772,200, filed September 4, 1947, now Patent No. 2,558,730, dated July 3, 1951, and in my aforementioned copending application Serial No. 68,370, now abandoned in favor of copending application Serial No. 73,078, filed January 27, 1949, and which has matured into Patent No. 2,558,731, dated July 3, 1951, as well as in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the diguanidinium salt or a finishing composition or textile-treating agent containing the same to the thermoplastic vinyl resin in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other dispersion or emulsion containing the diguanidinium salt. Alternatively, the liquid finishing composition containing the diguanidinium salt may be applied to the vinyl resin article by immersing the article in a bath containing the same, or by spraying, brushing, coating or otherwise applying the finishing composition to the article. Examples of points during the production of a yarn at which the conditioning agent may be applied are during stretching of a wet spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple fiber manufacture, the conditioning agent may be applied to the yarn either prior to or after cutting the yarn into staple lengths.

If desired, the diguanidinium salt which is deposited in or on the treated article may be allowed to remain in place during and after the production of the article in its ultimate form. Generally, however, the applied conditioning agent comprising the diguanidinium salt is removed either prior to dyeing or, if it has been applied to the dyed article, prior to the sale of the article to the trade. The conditioning agent may be removed, if desired, from yarns, fabrics and the like containing the same by means of the usual aqueous scouring baths.

In order that those skilled in the art better may understand how the present invention can be carried into effect, the following examples are given by way of illustration and not by way of limitation. All parts and percentages are by weight. The anti-static agent employed in the various examples comprised a mixture of, by weight, about 30% of N-monohexadecyl diguanidinium sulfosuccinamate, about 25% of N-monoöctadecyl diguanidinium sulfosuccinamate and about 45% of N-monoöctadecenyl diguanidinium sulfosuccinamate. For purpose of brevity these sulfosuccinamates are referred to in the examples as "mixed diguanidinium sulfosuccinamates."

*Example 1*

A sample of polyacrylonitrile having an average molecular weight of about 90,000 was dissolved in a 53% aqueous, neutral solution of calcium thiocyanate at about 45° C. under an atmosphere of carbon dioxide in the proportion of about 7 parts of polymer to about 93 parts of calcium thiocyanate solution. The solution of polyacrylonitrile was spun by extruding it at about 70–80° C. through a 40-hole spinneret having hole diameters of 110 microns into a spinning bath consisting of water at 1°–2° C. The coagulated fiber was carried back and forth through the bath by means of a power-driven, submerged godet placed at one end of the bath and a set of free-running rollers at the other hand. The total bath travel of the fiber was about 144 inches. On leaving the bath the yarn was subjected, during its travel, to a stretch of about 725% in a hot water bath maintained at 98°–99° C., and was finally collected on a bobbin rotating in a water spray to keep the yarn in gel state. A spool of the yarn in gel state was suspended in an aqueous dispersion containing 2% of the mixed diguanidinium sulfosuccinamates hereinbefore described, which dispersion was prepared by heating 2 parts of the said mixed sulfosuccinamates in 98 parts of water, with agitation, at about 80° C. The dispersion was maintained at about 50° C. while treating the gelled yarn with the same. The treated yarn was continuously passed over heated, converging, drying rolls as is more fully described in my aforementioned copending application Serial No. 68,370. The dried yarn was immediately ring-twisted and collected on a bobbin. There was no development of static electricity on the yarn either during the drying operation or while it was being ring-twisted.

Yarn which was treated as above described with the aqueous dispersion containing the mixed diguanidinium sulfosuccinamates was found to run cleaner on the drying rolls than the same gel yarn which had not been treated with an anti-static agent. Furthermore, the dried yarn was easier to handle, since the treatment eliminated filament "ballooning" caused by the building up of electrostatic charges on the filaments during the processing.

Similar results are obtained when the above-described dispersion containing the mixed diguanidinium sulfosuccinamates is applied to a water-swollen or gelled film of polyacrylonitrile, and the treated film in gel state is then dried.

*Example 2*

The procedure described under Example 1 is followed exactly with the exception that the aqueous dispersion contains 1% of an ester of a long-chain fatty acid, more particularly butyl stearate, in addition to 2% of the mixed diguanidinium sulfosuccinamates. Similar results are obtained.

*Example 3*

In this example swatches of thread spun from a copolymer of 95% acrylonitrile and 5% methyl acrylate were treated. The threads of one swatch were in water-swollen, gel state and had been spun as described in my aforementioned copending application Serial No. 772,200. The other swatch was made from the same copolymer threads in dry state, in which state they accumulated a charge of static electricity when stroked either by hand or with a strip of cellulose acetate.

An aqueous dispersion was prepared by dispersing 2 parts of the aforementioned mixed diguanidinium sulfosuccinamates in 198 parts of water and heating to about 50° C. The above swatches were worked in this dispersion for about 1 or 2 minutes in order to obtain thorough penetration. After squeezing to remove excess liquid, they were dried first at room temperature in a current of air and then in a 60° C. oven for 30 minutes.

The two dry swatches were stroked by hand and also with a strip of cellulose acetate. In neither case was there any development of static charge, in contrast to the results obtained with a dry untreated swatch of the same thread which "ballooned" when similarly stroked.

*Example 4*

An aqueous dispersion containing 1% of butyl stearate and 1% of the aforementioned mixed diguanidinium sulfosuccinamates was prepared. This dispersion was held at about 67° C., and into it was dipped a dry swatch and a gel swatch of the same thread used in Example 3. The subsequent treatment of these swatches was identical with that described in Example 1.

The two dry swatches were stroked by hand and also with a strip of cellulose acetate. In neither case was there any development of static charge, in contrast to the results obtained with a dry untreated swatch of the same thread which "ballooned" when similarly stroked.

*Example 5*

The following fibers produced from other thermoplastic vinyl resins were used in this example:

1. Orlon (a polyacrylonitrile fiber).
2. Vinyon (made from a high-molecular-weight copolymer of about 88–90% vinyl chloride and about 12–10% vinyl acetate).
3. Vinyon N (made from a copolymer of about 60% vinyl chloride and about 40% acrylonitrile).

Swatches of the above fibers were each treated ("boiled off") in an aqueous solution heated to a temperature of about 60° C. and containing about 1% of N-octadecyl disodium sulfosuccinamate in order to remove any finish that may have been present on the fibers. The swatches were then thoroughly washed in water and dried first at room temperature and then in a 60° C. oven for about 30 minutes. The dry swatches became readily charged with static electricity when stroked with the hand.

Each of the dry swatches was immersed in an aqueous dispersion containing 2% of the aforementioned mixed diguanidinium sulfosuccinamates. The swatches were worked for a few minutes in the dispersion, which was at a temperature of about 50° C., after which they were dried first at room temperature and then in an oven maintained at a temperature of about 60° C. for about 30 minutes. The dry, treated swatches did not develop any electrostatic charge when stroked either with the hand or with a piece of cellulose acetate in strip form. The treated specimens exhibited no changes in color or any other material changes in properties from those exhibited by the dry, "boiled off" swatches, with the exception that they had a softer feeling to the touch and would not develop a static charge.

It will be understood, of course, by those skilled in the art that my invention is not limited to the particular mixture of diguanidinium salts, the particular vinyl resins or the particular conditions of applying the former to the latter as given in the above illustrative examples. For instance, in place of the aforementioned mixture of N-monohexadecyl, N-monoöctadecyl and N-monoöctadecenyl sulfosuccinamates, any of the other diguanidinium salts (or mixtures of the said salts in any proportions) of the kind embraced by Formulas I and II, numerous examples of which have been mentioned hereinbefore, may be employed. Diguanidinium salts of N-(monoaliphatic hydrocarbon)-substituted sulfosuccinamic acids wherein the aliphatic hydrocarbon grouping attached to the amide nitrogen atom contains less than 12 carbon atoms, e. g., from 1 to 11 carbon atoms, inclusive, also would be expected to have the characteristic property of imparting anti-static characteristics to the thermoplastic vinyl resins, but probably would be less desirable because, as a result of the shorter chain length of the aliphatic hydrocarbon grouping, they would be expected to have less lubricating and softening effect upon the vinyl resin articles. Likewise, those diguanidinium salts wherein the aliphatic hydrocarbon grouping attached to the amide nitrogen atom contains more than 18 carbon atoms, e. g., from 20 to 32 or more carbon atoms, also would be expected to have the same characteristic property of imparting anti-static characteristics to thermoplastic vinyl resins, but such salts are more costly to produce because of the higher aliphatic amine required for their manufacture and the lesser availability and greater cost of such higher amines.

Likewise it will be understood by those skilled in the art that the invention is not limited to the treatment of the specific vinyl resins given by way of illustration in the foregoing examples, since, to the best of my knowledge and belief, any thermoplastic vinyl resin which in its dry state normally accumulates or tends to accumulate static charges of electricity is amenable to treatment with a diguanidinium salt (or mixture of diguanidinium salts) of the kind embraced by Formulas I and II to obviate or minimize the accumulation of static charges of electricity thereon. Numerous examples of such vinyl resins have been given hereinbefore.

As has been indicated in a portion of this specification prior to the examples, the preferred vinyl resin which is subjected to treatment in accordance with this invention is polymeric acrylonitrile or copolymeric acrylonitrile containing in its molecules a substantial amount of combined acrylonitrile. Of such copolymeric acrylonitriles, I prefer to treat an acrylonitrile copolymer containing in the polymer molecules an average of at least about 85% by weight of combined acrylonitrile. In such copolymeric polymerization products, the proportions of monomers in the polymerizable mixture from which the copolymers are made preferably are adjusted so that the final copolymer contains in the molecules thereof an average of at least about 85% by weight of acrylonitrile (combined acrylonitrile). The expression "acrylonitrile polymerization product containing in the molecules thereof an average of at least about 85% by weight of combined acrylonitrile," as used herein and in certain of the appended claims, means a polymerization product (polymer, copolymer or interpolymer or mixture thereof) containing in its molecules an average of at least about 85% by weight of the acrylonitrile unit, which is considered to be present in the individual polymer molecule as the group

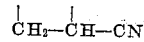

or, otherwise stated, at least about 85% by weight of the reactant substance converted into and forming the polymerization product is acrylonitrile (combined acrylonitrile). Examples of monomers which may be employed in the preparation of such copolymers of acrylonitrile have been given hereinbefore.

The use of diguanidinium salts of the kind embraced by Formulas I and II in the treatment of thermoplastic vinyl resins to obviate or lessen the tendency of such resins to accumulate charges of electricity thereon has numerous advantages, among which may be mentioned their relatively lower cost as compared with others which have been suggested for this same general purpose;

their ease of application (e. g., as aqueous dispersions); the fact that they do not form insoluble compounds in dispersions in hard water; their effectiveness both as anti-static agents and in lubricating and softening the shaped article in yarn or other form, whereby the treated yarn, film or other article is rendered more amenable to further processing or fabricating (e. g., weaving, knitting, etc., in the case of yarns); their compatibility with other conditioning agents commonly employed in finishing compositions used in treating fibers and other shaped articles formed of or containing a vinyl resin; their ease of removal from the treated article, when such removal appears to be desirable for subsequent processing or use of the article; their non-harmful effect upon the thermoplastic vinyl resin which is subjected to treatment; as well as other advantages.

The term "yarn" as used generically herein and in the appended claims includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein and in the appended claims includes within its meaning both monofilaments and multifilaments.

I claim:

1. The method of conditioning a shaped article comprising a thermoplastic vinyl resin to lessen its tendency to accumulate static charges of electricity thereon, said method comprising applying to the said article a volatile liquid containing an N-(mono-aliphatic hydrocarbon) diguanidinium sulfosuccinamate, the aliphatic hydrocarbon grouping attached to the amide nitrogen atom containing from 12 to 18 carbon atoms, inclusive, the amount of the said sulfosuccinamate being such that the finished article has associated therewith from, by weight, 0.2% to 4% of the said sulfosuccinamate, based on the weight of the dried, untreated article, and drying the thusly treated article.

2. A method as in claim 1 wherein the thermoplastic vinyl resin contains in its molecules a substantial amount of combined acrylonitrile.

3. A method as in claim 1 wherein the shaped article is in the form of a film.

4. A method as in claim 1 wherein the shaped article is in the form of a fiber.

5. A method as in claim 1 wherein the sulfosuccinamate is an N-monoalkyl diguanidinium sulfosuccinamate, the alkyl grouping attached to the amide nitrogen atom containing from 12 to 18 carbon atoms, inclusive.

6. A method as in claim 5 wherein the sulfosuccinamate is N-monoöctadecyl diguanidinium sulfosuccinamate.

7. The method of conditioning a yarn comprising fibers of a thermoplastic product of polymerization of a polymerizable mass comprising a preponderant proportion by weight of acrylonitrile to lessen its tendency to accumulate static charges of electricity thereon, said method comprising contacting the said yarn with an aqueous dispersion containing from about 0.5% to about 5% by weight thereof of an N-monoalkyl diguanidinium sulfosuccinamate, the alkyl grouping attached to the amide nitrogen atom containing from 12 to 18 carbon atoms, inclusive, the amount of the said dispersion with which the said yarn is contacted being such that the dried yarn has associated therewith from, by weight, 0.2% to 4% of the said sulfosuccinamate, based on the weight of the dried, untreated yarn, and drying the thusly treated yarn.

8. The method of treating fibers of a thermoplastic product of polymerization of a polymerizable mass comprising at least about 85% by weight of acrylonitrile to impart anti-static characteristics thereto, said method comprising contacting the said fibers with an aqueous dispersion containing from about 0.5% to about 5% by weight thereof of an anti-static agent comprising N-monoöctadecyl diguanidinium sulfosuccinamate, the amount of the said dispersion with which the said fibers are contacted being such that the dried fibers have associated therewith from, by weight, 0.2% to 4% of the said sulfosuccinamate, based on the weight of the dried, untreated fibers, and drying the thusly treated fibers.

9. The method which comprises applying a liquid treating agent to a fiber in gel state and in which the solid phase comprises an acrylonitrile polymerization product containing in the molecules thereof an average of at least about 85% by weight of combined acrylonitrile, said treating agent comprising an aqueous dispersion containing an N-monoalkyl diguanidinium sulfosuccinamate, the alkyl grouping attached to the amide nitrogen atom containing from 12 to 18 carbon atoms, inclusive, and drying the thusly treated, gelled fiber, the said sulfosuccinamate imparting anti-static characteristics to the said fiber during and after drying thereof, and the amount of the said dispersion which is applied to the said fiber in gel state being such that the dried fiber has associated therewith from, by weight, 0.2% to 4% of the said sulfosuccinamate, based on the weight of the dried, untreated fiber.

10. A shaped article comprising a thermoplastic vinyl resin which in a dry state normally has a tendency to accumulate static charges of electricity thereon, said article having deposited at least on outer surfaces thereof an N-(mono-aliphatic hydrocarbon) diguanidinium sulfosuccinamate, the aliphatic hydrocarbon grouping attached to the amide nitrogen atom containing from 12 to 18 carbon atoms, inclusive, said sulfosuccinamate lessening the tendency of the said article to accumulate static charges of electricity thereon and being associated with the said article in an amount corresponding to from 0.2% to 4% of the weight of the dried, untreated article.

11. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having been treated with an anti-static agent comprising an N-monoalkyl diguanidinium sulfosuccinamate, the alkyl grouping attached to the amide nitrogen atom containing from 12 to 18 carbon atoms, inclusive, the amount of the said sulfosuccinamate which is associated with the said textile corresponding to from 0.2% to 4% of the weight of the dry, untreated textile.

12. The method of conditioning a yarn comprising fibers of a thermoplastic product of polymerization of polymerizable vinyl compound including acrylonitrile, said method comprising contacting the said yarn with an aqueous dispersion containing a diguanidinium sulfosuccinamate including an N-monoalkenyl diguanidinium sulfosuccinamate wherein the alkenyl grouping attached to the amide nitrogen atom contains from 12 to 18 carbon atoms, inclusive, and drying the thusly treated yarn, the said sulfosuccinamate imparting anti-static characteristics to the said yarn, and the amount of the said dispersion with which the said yarn is contacted being such that the dried yarn has associated therewith from, by weight, 0.2% to 4% of the said diguanidinium sulfosuccinamate, based on the weight of the dried, untreated yarn.

13. Textile fibers formed of an acrylonitrile polymerization product containing in the molecules thereof an average of at least 85% by weight of combined acrylonitrile, said fibers having deposited at least on outer surfaces thereof a conditioning agent comprising a mixture of N-monohexadecyl diguanidinium sulfosuccinamate, N-monoöctadecyl diguanidinium sulfosuccinamate and N-monoöctadecenyl diguanidinium sulfosuccinamate, said mixture of sulfosuccinamates lessening the tendency of the said fibers to accumulate static charges of electricity thereon and constituting from 0.2% to 4% of the weight of the dry, untreated fibers.

ARTHUR CRESSWELL.

References Cited in the file of this patent

UNITED STATES PATENTS

| Number | Name | Date |
|---|---|---|
| 2,176,402 | Koch | Oct. 17, 1939 |
| 2,197,930 | Jackson | Apr. 23, 1940 |
| 2,289,760 | Dickey et al. | July 14, 1942 |
| 2,331,664 | Dickey et al. | Oct. 12, 1943 |
| 2,383,130 | Jaeger | Aug. 21, 1945 |
| 2,403,960 | Stoops | July 16, 1946 |
| 2,427,242 | Vitalis et al. | Sept. 9, 1947 |